UNITED STATES PATENT OFFICE.

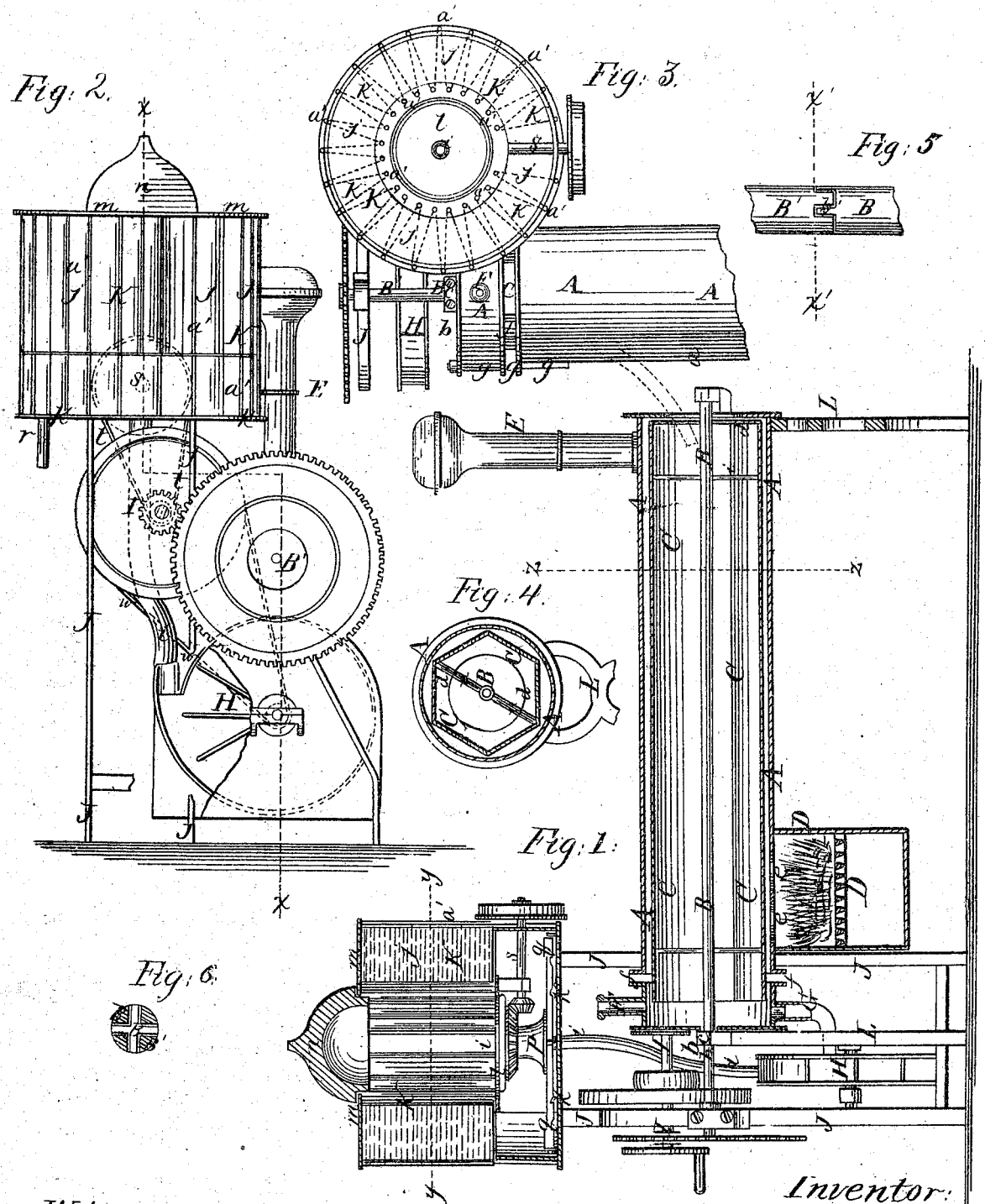

HORATIO H. BINGHAM AND JOHN C. HUNT, OF TERRE HAUTE, INDIANA.

IMPROVEMENT IN GRAIN-DRIERS.

Specification forming part of Letters Patent No. 75,844, dated March 24, 1868.

*To all whom it may concern:*

Be it known that we, H. H. BINGHAM and J. C. HUNT, of Terre Haute, in the county of Vigo and State of Indiana, have invented a new and Combined Meal and Chop Drier and Cooler; and we do hereby declare that the following is a full, clear, and exact description thereof, which will enable those skilled in the art to make and use the same, reference being had to the accompanying drawings, forming part of this specification, in which—

Figure 1 is a vertical longitudinal section of our improved meal and chop drier and cooler, the plane of section being indicated by the line $x\ x$, Fig. 2. Fig. 2 is a rear elevation, partly in section, of the same. Fig. 3 is a horizontal sectional view of the same, taken on the line $y\ y$, Fig. 1. Fig. 4 is a vertical cross-section of the same, taken on the line $a\ z$, Fig. 1. Fig. 5 is a detail view, showing the connection between the moving and movez portions of the cylinder-shaft. Fig. 6 is e vertical cross-section of the same, the pland of section being indicated by the line $x'\ x'$, Fig. 5.

Similar letters of reference indicate corresponding parts.

This invention relates to a new device for drying and cooling meal and chop; and consists in the use of an inclined polygonal reel, which is open at both ends, and into the higher end of which the meal or chop, as it comes from the mill, is fed. The said reel is arranged in a cylindrical tube, which is connected with a fire-place, in which heat is generated, so that the said reel will be surrounded by the products of combustion and by the hot air which are generated in the fire-place.

The reel is revolved, and the meal in it is dried by the surrounding hot air, and is conveyed to the lower end of the reel, whence it is discharged into a fan, by which it is elevated to the cooler.

The latter is surrounded by a canvas wall, in which the canvas is arranged in a zigzag line, so that a large porous area for escape of the air which is forced up by the fan is provided. The meal is cooled by the blast of air created by the fan, and is discharged from the aforesaid canvas-lined chamber by suitable mechanism, ready for use.

A represents a cylinder, made of sheet-iron or other suitable metal, and supported by a frame or posts, L, by which it is held in an inclined position, as is clearly shown in Fig. 1, the front end $a$ being higher than the rear end $b$.

To the ends or heads of the stationary cylinder A are arranged bearings $c\ c$ for a shaft, B, which is arranged concentric in the cylinder A, and on which a hexagonal or polygonal reel, C, is mounted by means of arms $u\ u$, as shown in Figs. 1 and 4, both ends of the said reel being open, although a flange, $d$, is formed around the front end to prevent the meal from falling out at that end. Near to the rear or lower end of the stationary cylinder A is arranged a furnace, D, with grating, ash-box, and fire-box complete, as shown in Fig. 1.

The fire-box communicates with the cylinder A by means of a hole or holes, $e\ e$, through which the smoke and heated air pass into the cylinder, and, enveloping the reel, move toward the front end of the said cylinder, and out through a smoke-stack or chimney, E, which is arranged near the front end of the cylinder A, as is clearly shown in Fig. 1.

In rear of the holes $e\ e$ is arranged, in the circumference of the cylinder A, an open annular space, $f$, which is either formed by perforations or by making the said cylinder of two pieces, which are connected and held apart by bolts $g\ g$, as is clearly shown in Fig. 3.

This open space, or these holes, are for the purpose of creating a draft in the cylinder, by which the smoke and heated air are prevented from moving toward the rear of the cylinder A, and from entering the reel C through its open rear, and from thus coming in contact with the meal in the latter.

F is a small tube arranged in or near the rear end of the cylinder, between the end of the reel and that of the cylinder, to carry off the moist air which is evaporated by the heated meal.

The meal, which is fed by a hopper or tube from the mill into the front end of the reel C, is well stirred and thrown around in the latter, and is carried toward its rear lower end, whence, as a space is left between the rear ends of the reel and cylinder, it is discharged into the rear lower end of the cylinder A, from which it is conveyed by a tube, G, to a fan, H. The latter is driven by a belt, w, from the horizontal driving-shaft I, from which motion is also imparted, by means of gear-wheels, to the shaft B.

The driving-shaft has its bearings in a stationary frame-work, J. In the same frame are the bearings for the rear end B' of the shaft B, which is connected with the main shaft B by a claw-coupling, h, which is fully shown in Figs. 5 and 6, and by which the removal, for cleaning and other purposes, of the reel is permitted.

By the fan H, the construction of which may be variable, the meal is forced up through a tube, i, into a receptacle or cooler, K, which is constructed with canvas sides j, with a solid bottom, k, with a false revolving bottom, l, and with a top or cover, m, in which a removable cap, n, is arranged, as is clearly shown in Figs. 1 and 3.

That portion of the circumference which is between the bottoms k and l being cylindrical, a current of air and meal is forced up by the fan H into the cooler K, whence the air escapes through the porous sides or circumference j, which is arranged in a zigzag line, as shown in Fig. 3, by being laid around suitable stationary vertical pins a' a', as shown in Fig. 3, to afford the largest possible area of porous material for the escape of the air.

The meal falls upon the false bottom l, which is revolved by means of bevel-gearing o, and is, by centrifugal motion, brought to the rim of the said disk or false bottom l, whence it falls upon the fixed bottom k. Those portions of the meal which are thrown against the canvas j are sufficiently cooled, and fall directly upon the bottom k, as the disk l does not reach under the triangular spaces formed by the sides j. Above the bottom k of the cooler K are arranged, around a vertical hollow axle, p, through which the tube i passes, a series of radial scrapers or sweepers, q, by which the meal that has fallen upon said bottom is swept toward a hole in the bottom k, whence it falls through a tube, r, into bags or other suitable receptacles.

The disk l is mounted on top of the hollow axle p, and is moved by means of the bevel-gears o from a horizontal shaft, s, to which motion is imparted from the driving-shaft by means of a belt, t, as is clearly shown in Figs. 1 and 2.

We claim as new and desire to secure by Letters Patent—

1. The polygonal inclined reel C, in combination with the furnace or heating cylinder A, the same being provided with a draft hole or holes, f, near its lower end, with a chimney, E, and with a tube, F, for the escape of moisture from the meal, as set forth.

2. Making the shaft B, on which the reel C is hung, of two pieces, which are connected by a coupling, h, so that the reel can be easily removed, as set forth.

3. Providing the reel C with a flange, d, at its upper open end, as set forth.

4. The cooler K, when provided with zigzag canvas or porous sides j, substantially as and for the purpose herein shown and described.

5. The cooler K, when provided with zigzag sides j, false revolving bottom l, stationary bottom k, and sweepers q, as set forth.

6. The cooler K, when provided with zigzag porous sides, in combination with the fan H, inclined stationary cylinder or furnace A, and inclined revolving polygonal reel C, all made and operating substantially as and for the purpose herein shown and described.

HORATIO H. BINGHAM.
J. C. HUNT.

Witnesses:
THOMAS J. FORREST,
L. B. DENEHIE.